(12) United States Patent
Shima et al.

(10) Patent No.: US 9,617,952 B2
(45) Date of Patent: Apr. 11, 2017

(54) COMPRESSION RING AND ITS PRODUCTION METHOD

(75) Inventors: Yuji Shima, Kashiwazaki (JP); Junya Takahashi, Kashiwazaki (JP); Ryouichi Kamon, Ono (JP)

(73) Assignees: KABUSHIKI KAISHA RIKEN, Tokyo (JP); TOKUSEN KOGYO CO., LTD., Ono (JP)

( * ) Notice: Subject to any disclaimer, the term of this patent is extended or adjusted under 35 U.S.C. 154(b) by 760 days.

(21) Appl. No.: 13/699,465

(22) PCT Filed: May 24, 2011

(86) PCT No.: PCT/JP2011/061857
§ 371 (c)(1),
(2), (4) Date: Nov. 21, 2012

(87) PCT Pub. No.: WO2011/148934
PCT Pub. Date: Jan. 12, 2011

(65) Prior Publication Data
US 2013/0062835 A1 Mar. 14, 2013

(30) Foreign Application Priority Data
May 25, 2010 (JP) ................................. 2010-119048

(51) Int. Cl.
*F02F 5/00* (2006.01)
*C21D 9/40* (2006.01)
(Continued)

(52) U.S. Cl.
CPC .................. *F02F 5/00* (2013.01); *C21D 9/40* (2013.01); *C22C 38/02* (2013.01); *C22C 38/04* (2013.01); *C22C 38/24* (2013.01); *F16J 9/26* (2013.01)

(58) Field of Classification Search
CPC ........................................................ F02F 5/00
See application file for complete search history.

(56) References Cited

U.S. PATENT DOCUMENTS 4,966,751 A * 10/1990 Kaede ..................... C22C 38/18
148/318
6,306,230 B1 10/2001 Hengerer
(Continued)

FOREIGN PATENT DOCUMENTS

EP 1887096 A1 2/2008
JP 58-45357 A 3/1983
(Continued)

OTHER PUBLICATIONS

"Cast steel: The Formation of Martensite." Key to Metals. Web. Aug. 13, 2009.*
(Continued)

*Primary Examiner* — Keith Walker
*Assistant Examiner* — Stephani Hill
(74) *Attorney, Agent, or Firm* — Birch, Stewart, Kolasch & Birch, LLP

(57) ABSTRACT

To provide a price-competitive compression ring having excellent thermal conductivity and thermal sag resistance, which can be used in a high-thermal-load environment of high-compression-ratio engines, steel identified by the material number of SUP10 in JIS G 4801, which contains small amounts of alloying elements, is used, and a piston ring wire is annealed before an oil-tempering treatment such that spheroidal cementite having an average particle size of 0.1-1.5 μm is dispersed in a tempered martensite matrix, thereby suppressing the movement of dislocation and creep even at 300° C., and improving thermal sag resistance.

6 Claims, 3 Drawing Sheets

(51) Int. Cl.
   *C22C 38/02*    (2006.01)
   *C22C 38/04*    (2006.01)
   *C22C 38/24*    (2006.01)
   *F16J 9/26*     (2006.01)

(56) References Cited

U.S. PATENT DOCUMENTS

| | | | |
|---|---|---|---|
| 6,372,056 | B1 | 4/2002 | Kuroda et al. |
| 6,602,359 | B1 | 8/2003 | Ochi et al. |
| 7,575,619 | B2 | 8/2009 | Kawata et al. |
| 8,409,712 | B2 | 4/2013 | Yokoyama et al. |
| 8,557,056 | B2 | 10/2013 | Angles |
| 2003/0075250 | A1 | 4/2003 | Ochi et al. |
| 2004/0047757 | A1 | 3/2004 | Takayama |
| 2004/0256029 | A1* | 12/2004 | Takayama ............... C21D 1/10 148/218 |
| 2005/0103777 | A1* | 5/2005 | Takayama .................... 219/640 |
| 2006/0219054 | A1 | 10/2006 | Kawata et al. |
| 2008/0279714 | A1 | 11/2008 | Hashimura et al. |
| 2009/0226756 | A1 | 9/2009 | Ogawa et al. |
| 2009/0277539 | A1 | 11/2009 | Kimura et al. |
| 2010/0189592 | A1 | 7/2010 | Angles |
| 2010/0291407 | A1 | 11/2010 | Yokoyama et al. |
| 2014/0023551 | A1 | 1/2014 | Angles |

FOREIGN PATENT DOCUMENTS

| | | | |
|---|---|---|---|
| JP | 63-223147 A | 9/1988 | |
| JP | 6-299296 A | 10/1994 | |
| JP | 2000-239797 A | 9/2000 | |
| JP | 2000-337511 A | 12/2000 | |
| JP | 2001-294989 A | 10/2001 | |
| JP | 2006-183137 A | 7/2006 | |
| JP | 2007-321199 A | 12/2007 | |
| JP | 2009-235561 A | 10/2009 | |
| KR | 1020090071164 * | 7/2009 | ............ C22C 38/00 |
| WO | WO 01/48258 A1 | 7/2001 | |
| WO | WO 2009/093527 A1 | 7/2009 | |

OTHER PUBLICATIONS

G. F. Carter, D. E. Paul. "Materials Science and Engineering." ASM International, 1991, p. 104, Fig. 6.1.*
"The Tempering of Martensite: Part One." Key to Metals. Web. Feb. 17, 2009.*
KR1020090071164 machine translation.*
International Search Report issued in PCT/JP2011/061857, mailed on Jul. 12, 2011.
Japanese Office Action, dated Feb. 18, 2014, for Japanese Application No. 2010-119048 with an English translation.
The extended European search report, dated Mar. 30, 2015, issued in the corresponding European Patent Application No. 11786633.5.

* cited by examiner

COMPRESSION RING AND ITS PRODUCTION METHOD

FIELD OF THE INVENTION

The present invention relates to a piston ring for automobile engines, particularly to a compression ring used in a high-thermal-load environment in high-compression-ratio engines, and its production method.

BACKGROUND OF THE INVENTION

For environmental protection, automobile engines are recently designed to have improved fuel efficiency, low emission and high power, so that engines tend to have high compression ratios and high load. However, higher compression ratios generally elevate combustion chamber temperatures, so that knocking easily occurs. A usual measure against knocking is the delaying of ignition timing (spark advance), but it makes it impossible to keep high thermal efficiency. Accordingly, investigation is conducted to lower the temperature of combustion chamber walls. To lower the temperature of combustion chamber walls, it is effective to lower the temperature of piston crown surfaces. To this end, it is most effective to dissipate the heat of pistons to cooled cylinder walls via compression rings. Thus, among the three basic functions of piston rings, a gas-sealing function, a thermal conduction function and an oil control function, the thermal conduction function is utilized. Because the thermal conduction function is affected by ring substrates, the thermal conductivity of surface treatment layers, ring shapes, etc., they should be optimized. Also, what should be taken into consideration in the selection of materials are, in addition to thermal conductivity, thermal sag resistance and fatigue resistance making it possible to keep ring characteristics even in a thermal environment at about 300° C.

In addition, when pistons are made of aluminum, aluminum softens as the combustion chamber temperature is elevated, so that fatigue failure occurs in ring grooves of pistons due to the high-temperature impingement and sliding of compression rings, making likely the wearing of ring grooves and microwelding to compression rings. In view of this, the temperature of ring grooves should be lowered by using high-thermal-conductivity compression rings.

To meet the above demand, for example, JP 2009-235561 A proposes a proper composition comprising C, Si, Mn and Cr, which is defined by parameters in predetermined ranges, for piston rings having excellent thermal conductivity and thermal sag resistance, which are usable as compression rings. However, for example, such targets as thermal conductivity of 35 W/m·K or more and a thermal sag ratio (loss of tangential force) of 4% or less would be difficult to achieve.

Further, not only excellent characteristics but also price competitiveness are required on automobile parts such as piston rings. Thus, cost reduction is an important object.

OBJECT OF THE INVENTION

An object of the present invention is to provide a compression ring having excellent thermal conductivity and thermal sag resistance as well as good price competitiveness, which can be used in a high-thermal-load environment in high-compression-ratio engines, and a method for producing such a compression ring.

SUMMARY OF THE INVENTION

Table 1 shows the compositions of steels used for piston rings A-G and their thermal conductivities at 200° C. The relation between the thermal conductivity of the steel and the total amount of alloying elements is shown in FIG. 6. Materials with smaller amounts of alloying elements have higher thermal conductivities.

TABLE 1

Alloying elements[1] and thermal conductivities of steels for piston rings

| No. | Alloying Element (% by mass) | | | | | | | | | Total Amount | Thermal Conductivity (W/m · K) |
| --- | --- | --- | --- | --- | --- | --- | --- | --- | --- | --- | --- |
| | C | Si | Mn | Cr | Ni | Mo | Cu | V | N | | |
| A | 0.87 | 0.5 | 0.5 | 17.5 | — | 1.2 | — | 0.1 | — | 20.67 | 22 |
| B | 0.33 | 0.5 | 0.5 | 13.0 | — | — | — | — | — | 14.33 | 26 |
| C | 0.55 | 0.25 | 0.8 | 0.8 | — | — | — | — | — | 2.4 | 38 |
| D | 0.55 | 1.4 | 0.65 | 0.65 | — | — | 0.1 | — | — | 3.35 | 31 |
| E | 0.62 | 0.25 | 0.45 | — | — | — | — | — | — | 1.32 | 47 |
| F | 0.04 | 0.5 | 1.0 | 19.0 | 9.2 | — | — | — | 0.13 | 29.87 | 17 |
| G | 0.08 | 0.5 | 6.5 | 17.0 | 4.5 | — | — | — | 0.12 | 28.7 | 16 |

Note:
[1]Though P and S are contained as inevitable impurities, they are not shown in this table.

However, the thermal sag resistance is actually deteriorated as the amounts of alloying elements decrease, making impossible use for compression rings in a high-thermal-load environment. Steel is generally more inexpensive as the amounts of alloying elements are smaller. Also, from the economic point of view, steel used in a large amount, namely, mass-produced like materials defined by JIS (Japanese Industrial Standards) is inexpensive. Accordingly, the present invention basically uses a JIS-defined material containing small amounts of alloying elements, with its microscopic structure controlled to have excellent thermal sag resistance even at a high temperature of 300° C. As a result of intensive research, the inventors have found that specifically using steel identified by the material number of SUP10 in JIS G 4801, when a piston ring wire is annealed before an oil-tempering treatment to precipitate spheroidal cementite, with the oil-tempering treatment conditions optimized, a proper amount of spheroidal cementite is dispersed in a tempered martensite matrix, suppressing the movement of dislocation and creep even at 300° C., and improving the thermal sag resistance.

Thus, the compression ring of the present invention has a composition comprising by mass 0.45-0.55% of C, 0.15-0.35% of Si, 0.65-0.95% of Mn, 0.80-1.10% of Cr, and 0.15-0.25% of V, the balance being Fe and inevitable impurities, with spheroidal cementite having an average particle size of 0.1-1.5 μm dispersed in a tempered martensite matrix. The spheroidal cementite preferably has an average particle size of 0.5-1.0 μm. The amount of spheroidal cementite dispersed is preferably 1-6% by area, on a microscopically observed structure surface.

The compression ring of the present invention preferably has thermal conductivity of 35 W/m·K or more, and a thermal sag ratio (loss of tangential force of the ring) of 4% or less.

The method of the present invention for producing a compression ring having a composition comprising by mass 0.45-0.55% of C, 0.15-0.35% of Si, 0.65-0.95% of Mn, 0.80-1.10% of Cr, and 0.15-0.25% of V, the balance being Fe and inevitable impurities, with spheroidal cementite having an average particle size of 0.1-1.5 μm dispersed in a tempered martensite matrix, comprises an annealing step before an oil-tempering treatment step before forming said compression ring. The annealing step is conducted preferably at a temperature of 600-720° C., and the oil-tempering treatment step is preferably conducted at a quenching temperature of 820-980° C. and a tempering temperature of 400-500° C.

DESCRIPTION OF THE PREFERRED EMBODIMENTS

Figure 1:
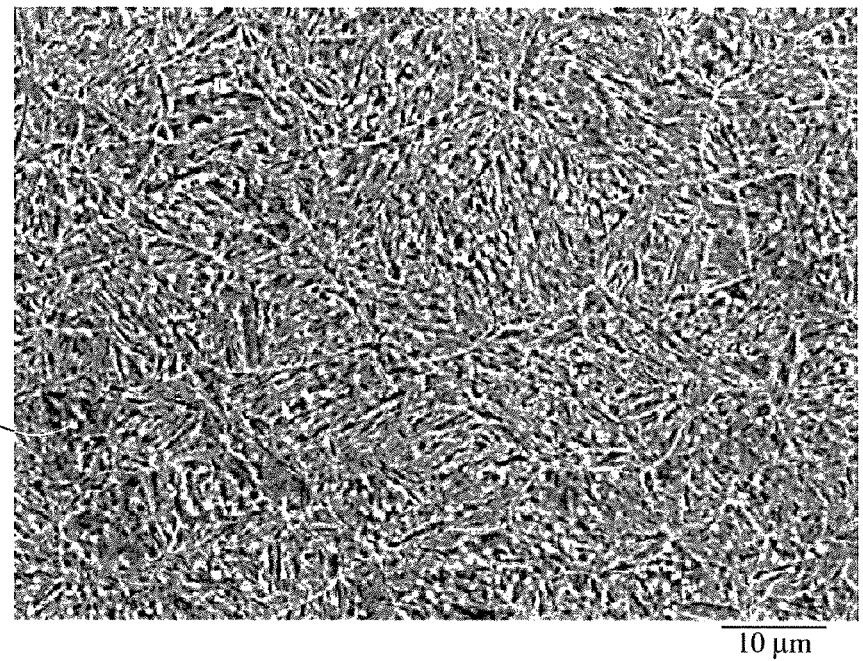
FIG. 1 is a scanning electron photomicrograph showing the secondary electron image of a cross section in Example 1.

The compression ring of the present invention has a composition comprising by mass 0.45-0.55% of C, 0.15-0.35% of Si, 0.65-0.95% of Mn, 0.80-1.10% of Cr, and 0.15-0.25% of V, the balance being Fe and inevitable impurities, with spheroidal cementite having an average particle size of 0.1-1.5 μm dispersed in a tempered martensite matrix. The above composition is basically a steel composition identified by the material number of SUP10 according to JIS G 4801, having high thermal conductivity because of a small total amount of alloying elements, though it comprises small amounts of Cr and V. However, it does not have sufficient thermal sag resistance. In the present invention, relatively large spheroidized cementite is dispersed in a tempered martensite matrix. This spheroidal cementite is known as residual cementite in spring steel subject to an oil-tempering treatment. Because stress is concentrated on the spheroidal cementite, it is considered as a factor of decreasing the mechanical properties of steel wires. However, the fact that excellent thermal sag resistance is achieved when used for compression rings among piston rings suggests that spheroidal cementite remaining in the oil-tempered matrix provides a crystal lattice with strain, making dislocation unlikely even at 300° C. In the present invention, the spheroidal cementite has an average particle size of 0.1 μm or more. Because the residual cementite of about 0.1 μm or less is dissolved in austenite in a solution treatment in an oil-tempering treatment, spheroidal cementite having an average particle size of less than 0.1 μm is not observed. If the average particle size exceeds 1.5 μm, the spheroidal cementite would undesirably act as starting sites of fatigue failure, resulting in reduced fatigue resistance. The preferred average particle size is 0.5-1.0 μm.

The amount of spheroidal cementite dispersed is preferably 1-6% by area on a microscopically observed structure surface. Within this dispersion range, the steel preferably has thermal conductivity of 35 W/m·K or more, and a thermal sag ratio (loss of tangential force according to JIS B 8032-5) of 4% or less. Commonly used Si—Cr steel has thermal conductivity of about 31 W/m·K, and the thermal conductivity of about 35 W/m·K is comparable to those of piston rings of conventional, high-thermal-conductivity flaky graphite cast iron. Because the thermal conductivity is mainly determined by the movement of free electrons in crystal grains of metals, higher thermal conductivity is obtained with fewer solid solution elements. The facts that the amount of Si, a solution-strengthening element, is particularly smaller in SUP10 used in the present invention than in Si—Cr steel, and that spheroidal cementite is formed, appear to contribute to the improvement of thermal conductivity by reducing the solid solution of C. Though JIS B 8032-5 indicates that the thermal sag ratios (loss of tangential force) of steel rings are 8% or less under the test conditions of 300° C. for 3 hours, the smaller, the better. Thus, the target value for material development has been set at about 4%, on the same level as that of the Si—Cr steel.

From the aspect of wear resistance and microwelding resistance, sliding peripheral surfaces of compression steel rings are usually subject to various surface treatments. When good thermal conductivity is predominantly needed, a chromium plating is preferable, but when wear resistance and microwelding resistance are important, ion-plated CrN coatings are preferable, and DLC coatings are suitable for aluminum cylinders. Thus, for the same compression rings, proper surface treatments may be selected depending on sliding mate members, use environment, etc. Of course, a nitriding treatment is also usable.

A wire used for the production of the compression ring of the present invention is produced by melting steel (SUP10) having a composition comprising by mass 0.45-0.55% of C, 0.15-0.35% of Si, 0.65-0.95% of Mn, 0.80-1.10% of Cr, and 0.15-0.25% of V, the balance being Fe and inevitable impurities, hot-rolling the steel to a wire, and providing the wire with a predetermined cross section shape by conducting spheroidizing annealing in place of part of patenting in a usual treatment sequence comprising patenting, washing with acid, drawing, patenting, washing with acid, drawing and oil-tempering (oil quenching and tempering). The patenting is a heat treatment of continuously causing isothermal or cooling transformation to provide a fine pearlite structure in a line heat treatment, specifically conducted in a temperature range of about 900° C. to about 600° C. In the present invention, the annealing step is conducted in place of the patenting treatment preferably at a temperature of 600-720° C., which is equal to or lower than an $A_{C1}$ point in an Fe—C phase diagram, for 30-240 minutes. Because spheroidal cementite having a predetermined particle size, which is formed by the spheroidizing annealing, is influenced by subsequent heat treatments and affects subsequent drawing, the spheroidizing annealing is preferably conducted immediately before the last oil-tempering treatment. Accordingly, the spheroidizing annealing is conducted preferably in place of the second patenting treatment. In this case, the spheroidizing annealing is inevitably a batch treatment. The batch treatment is inserted between continuous treatments in a conventional production line, inevitably resulting in lower productivity. Though the spheroidizing annealing may be conducted in place of the first patenting treatment for higher productivity, attention should be paid to provide the spheroidal cementite with particle sizes in a predetermined range. The temperature and time period of the oil-tempering treatment comprising an oil quenching step and a tempering treatment step should be set such that all spheroidal carbides are not dissolved, namely, the spheroidal carbides have a preferred area ratio. In the present invention, the quenching step is preferably conducted after heating at a temperature of 820-980° C. for several tens of seconds to several minutes, for example, 30 seconds to 3 minutes, and the tempering step is preferably conducted at a temperature of 400-500° C. for several tens of seconds to several minutes, for example, about 30 seconds to about 3 minutes. Because the heat treatment temperature and time differ depending on the size of a heat treatment furnace and the cross section areas of items to be treated, they should be adjusted such that the spheroidal cementite has preferred particle size and area ratio.

The compression ring of the present invention is obtained from the above wire drawn to have a predetermined cross section shape, usually by forming the wire to a free form ring by a cam machine, conducting a strain-removing heat treatment, and grinding the side surfaces, peripheral surface, gap, etc. of the ring to a predetermined ring shape. Of course, surface treatments such as plating, PVD, etc. may be conducted if necessary.

EXAMPLES 1-3

E1 to E3

Each wire of SUP10 steel rolled to 8 mm in diameter was formed into a rectangular cross-sectioned wire of 1.0 mm in thickness and 2.3 mm in width, by conducting an annealing step at 700° C. for 60 minutes in place of the second patenting treatment, in a wire-forming process comprising heating at 900° C., patenting at 600° C., washing with acid, wire drawing, heating at 900° C., patenting at 600° C., washing with acid, wire drawing and oil-tempering. The oil-tempering treatment comprised a quenching step in an oil at 60° C. after heating at 930° C. for 45 seconds, and a tempering step at 470° C. for 60 seconds. FIG. 1 shows the structure of the wire observed by a scanning electron microscope, in which white fine spheroidal cementite (1) was dispersed in a tempered martensite. Image analysis on an enlarged photomicrograph of this structure revealed that the spheroidal cementite had an average particle size of 0.8 μm and an area ratio of 2.4%.

EXAMPLES 4-5

E4 to E5

Each rectangular cross-sectioned wire of 1.0 mm in thickness and 2.3 mm in width was produced from the SUP 10 steel by conducting annealing at 700° C. in place of the second patenting treatment as in Examples 1-3. To control the spheroidal cementite dispersed in a tempered martensite matrix, the temperature of heating before quenching in the oil-tempering treatment was 980° C. in Example 4, and 820° C. in Example 5. Image analysis conducted in the same manner as in Example 1 on scanning electron photomicrographs of the wire structures revealed that the spheroidal cementites in Examples 4 and 5 had average particle sizes of 0.4 μm and 1.2 μm, respectively, and area ratios of 0.3% and 5.3%, respectively.

Each rectangular cross-sectioned wire of 1.0 mm in thickness and 2.3 mm in width in Examples 1-5 was formed into a compression ring having a nominal diameter of 73 mm, which was subject to a coating treatment shown in Table 2. Namely, a peripheral surface of the compression ring was provided with a CrN coating by ion plating, and side surfaces of the compression ring were provided with a zinc phosphate coating (Example 2) and a manganese phosphate coating (Example 3).

Comparative Examples 1-5

C1 to C5

In Comparative Example 1, a rectangular cross-sectioned wire of 1.0 mm in thickness and 2.3 mm in width was produced by a conventional wire-forming process comprising two patenting treatments (without introducing an annealing step into the wire-forming process of Examples 1-5), and formed into a compression ring. In Comparative Examples 2-4, Si—Cr steel (JIS SWOSC-V) was used in place of the SUP10 steel of Comparative Example 1 to produce rectangular cross-sectioned wires of 1.0 mm in thickness and 2.3 mm in width in the same manner as in Comparative Example 1, and each wire was formed into a compression ring, and subjected to a surface treatment shown in Table 2 as in Examples 1-5. In Comparative Example 5, a hard steel wire (JIS SWRH62A) was used in place of the SUP10 steel of Comparative Example 1 to produce a rectangular cross-sectioned wire of 1.0 mm in thickness and 2.3 mm in width in the same manner as in Comparative Example 1, and formed into a compression ring. All peripheral surfaces in Comparative Examples 1-5 were coated with CrN, side surfaces in Comparative Example 3 were coated with zinc phosphate, and side surfaces in Comparative Example 4 were coated with manganese phosphate.

Figure 2:
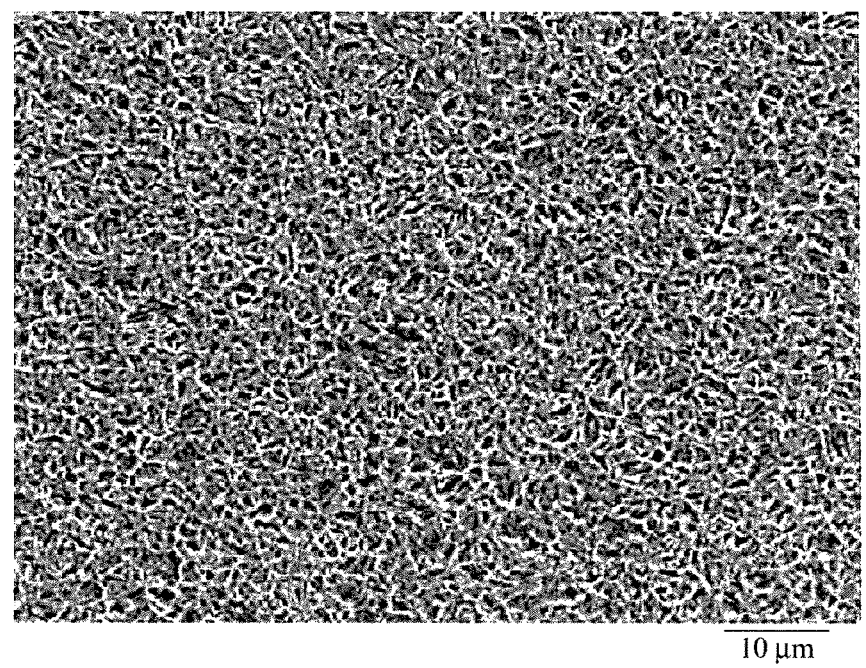
FIG. 2 is a scanning electron photomicrograph showing the secondary electron image of a cross section in Comparative Example 1.

In a scanning electron photomicrograph of FIG. 2 showing the structure of the wire of Comparative Example 1, only uniform tempered martensite was observed, without fine spheroidal cementite in Example 1.

Thermal Sag Test

In a thermal sag test according to JIS B 8032-5, the spring force of a ring was first measured, and a spring force was measured again after the ring closed to a nominal diameter was heated at 300° C. for 3 hours, to evaluate the loss of tangential force according to JIS. The test was conducted 5 times in each of Examples 1, 4 and 5, and Comparative Examples 1, 2 and 5, and the measured results were averaged. The averaged values of the thermal sag resistance were shown in Table 2. The thermal sag resistances (average values) of Examples 1, 4 and 5 were 24%, 4% and 26%, respectively, better than that of Comparative Example 1 having substantially the same thermal conductivity. Examples 1 and 5 achieved a target of 4% or less, with small unevenness.

Measurement of Thermal Conductivity

In Examples 1, 4 and 5, and Comparative Examples 1, 2 and 5, the thermal conductivity was measured by a laser flash method. The results are shown in Table 2. Example 1 was higher than the Si—Cr steel of Comparative Example 2 but lower than the hard steel wire of Comparative Example 5 in thermal conductivity, confirming that the thermal conductivity depends on the amounts of alloying elements.

Figure 3:
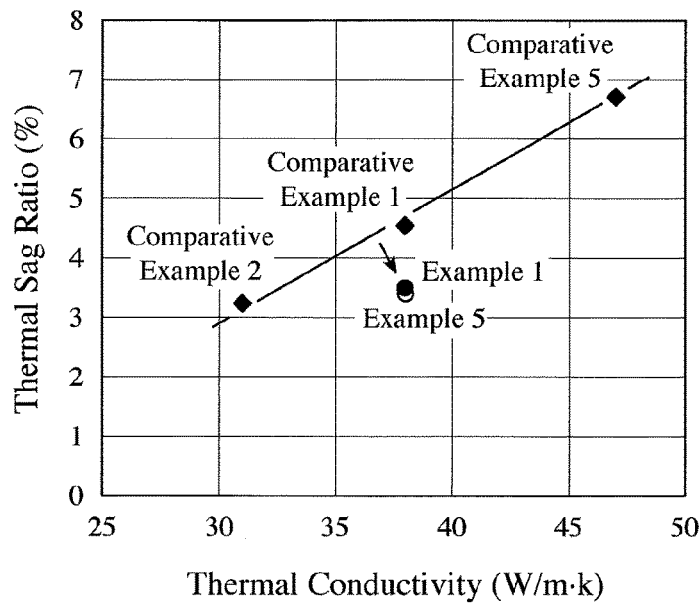
FIG. 3 is a graph showing the relation between thermal conductivity and a thermal sag ratio in Examples 1 and 5, and Comparative Examples 1, 2 and 5.

FIG. 3 shows the relation between the thermal sag ratio and the thermal conductivity. A higher thermal conductivity provided a higher thermal sag ratio in Comparative Examples 1, 2 and 5, but the thermal sag ratios of Examples 1 and 5 were lower than a line connecting three Comparative Examples, confirming that the thermal sag ratio decreased at the same thermal conductivity, namely improvement in the thermal sag resistance.

Microwelding Test

Figure 4:
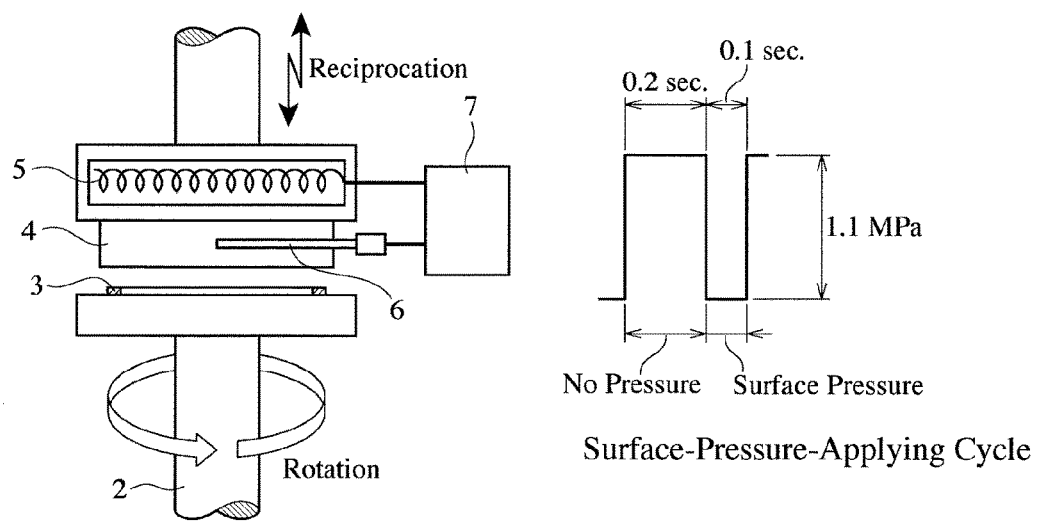
FIG. 4 is a schematic view showing a microwelding test.
Figure 5:
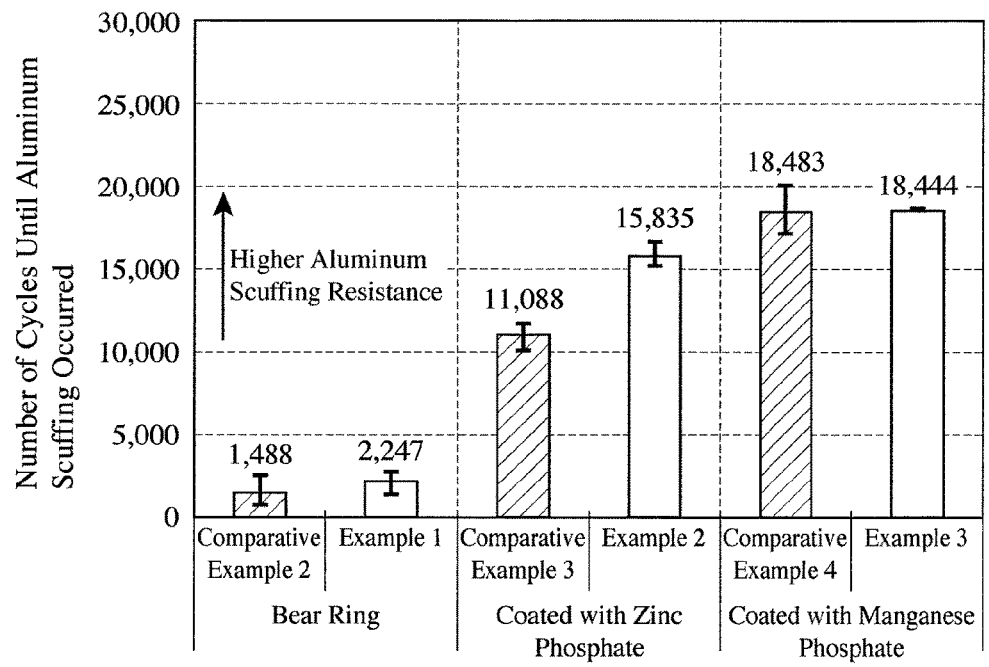
FIG. 5 is a graph showing the microwelding test results of Examples 1-3 and Comparative Examples 2-4.
Figure 6:
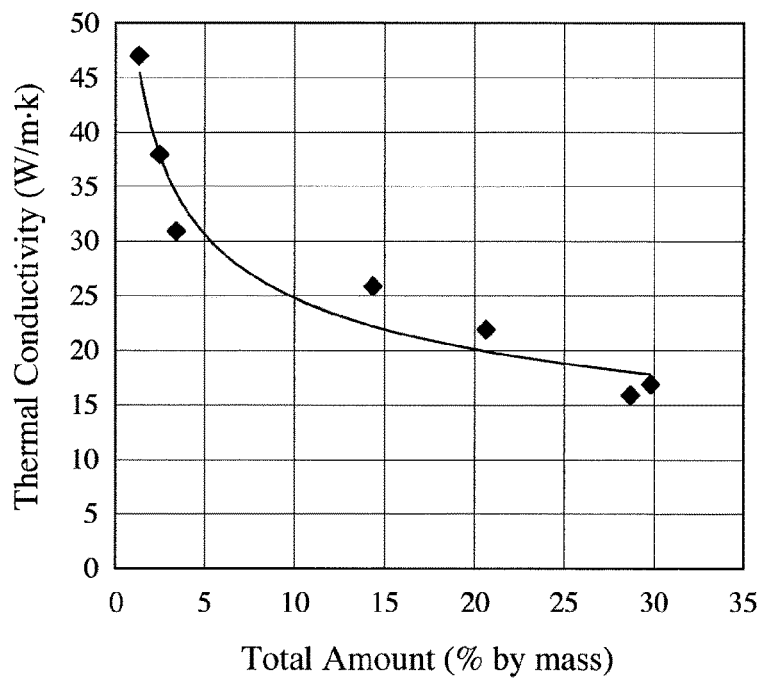
FIG. 6 is a graph showing the relation between the total amount of alloying elements and thermal conductivity in steels used for piston rings.

The microwelding test uses an apparatus (for example, Tribolic IV available from Riken Corporation) shown in FIG. 4, in which a ring (compression ring) (3) is concentrically placed on a table rotating at a low speed, and a piston (AC8A) (4) controlled at a predetermined temperature is longitudinally reciprocated with a constant period to apply surface pressure to the ring periodically, the reciprocation of the piston being repeated until microwelding occurs. When the microwelding occurs, the torque of a rotating shaft (2) changes, accompanied by temperature elevation. In FIG. 4, references numbers 5, 6, and 7, respectively, represent a heater, a thermocouple, and a temperature controller. The number of cycles at that time was used to evaluate the life of the ring. The test conditions were a test temperature of 240° C., a surface pressure amplitude of 0-1.1 MPa, a surface pressure frequency of 3.3 Hz, and a ring rotation speed of 3.3 m/sec (rotation in one direction), and a ring surface was coated with 0.08 cc of a base oil (SAE30) without additives as a lubricant. The results are shown in Table 2 and FIG. 5. With respect to the microwelding resistance life, Example 1 without a surface treatment (bear ring) was 51% longer than Comparative Example 2, and Example 2 with a zinc phosphate coating was 43% longer than Comparative Example 3. In Example 3 with a manganese phosphate coating, the difference of a substrate did not change the microwelding resistance life. This appears to be due to influence by the surface roughness of the manganese phosphate coating.

EFFECTS OF THE INVENTION

Because the compression ring of the present invention has both high thermal conductivity and high thermal sag resistance, even when used in a high-thermal-load environment such as high-compression-ratio engines, the ring can efficiently dissipate heat from a piston head to a cooled cylinder wall without losing a spring force. Accordingly, knocking can be suppressed without needing such control as to delay ignition timing, keeping high thermal efficiency. Also, the temperature of ring grooves of an aluminum piston can be lowered, suppressing microwelding and wearing of the ring grooves. The production method of the present invention using mass-produced steel defined by JIS contributes to cost reduction.

What is claimed is:

1. A compression ring consisting of a composition consisting of by mass 0.45-0.55% of C, 0.15-0.35% of Si, 0.65-0.95% of Mn, 0.80-1.10% of Cr, and 0.15-0.25% of V, the balance being Fe and inevitable impurities, and spheroidal cementite having an average particle size of 0.1-1.5 μm dispersed in a tempered martensite matrix, wherein said compression ring has thermal conductivity of 35 W/m·K or more and thermal sag ratio of 4.4% or less.

2. The compression ring according to claim 1, wherein the amount of said spheroidal cementite dispersed is 1-6% by area on a microscopically observed structure surface.

3. The compression ring according to claim 1, having a thermal conductivity of 38 W/m·K or more, and thermal sag ratio of 4% or less.

4. A method for producing a compression ring consisting of a composition consisting of by mass 0.45-0.55% of C, 0.15-0.35% of Si, 0.65-0.95% of Mn, 0.80-1.10% of Cr, and 0.15-0.25% of V, the balance being Fe and inevitable impurities, and spheroidal cementite having an average particle size of 0.1-1.5 μm dispersed in a tempered martensite matrix, the method comprising a spheroidizing annealing step before an oil-tempering treatment step before forming said compression ring.

TABLE 2

| No. | Surface Treatment (Coating) Peripheral Surface | Surface Treatment (Coating) Side Surface | Spheroidal Cementite Dav[1] (μm) | Spheroidal Cementite Area Ratio (%) | Thermal Sag Resistance (%) AV[2] | Thermal Sag Resistance (%) RV[3] | Thermal Conductivity (W/m · k) | Microwelding Resistance Life[4] |
|---|---|---|---|---|---|---|---|---|
| E1 | CrN | — | 0.8 | 2.4 | 3.5 | 76 | 38 | 2,247 |
| E2 | CrN | Zinc Phosphate | — | — | — | — | — | 15,835 |
| E3 | CrN | Manganese Phosphate | — | — | — | — | — | 18,444 |
| E4 | CrN | — | 0.4 | 0.3 | 4.4 | 96 | 38 | — |
| E5 | CrN | — | 1.2 | 5.3 | 3.4 | 74 | 38 | — |
| C1 | CrN | — | — | — | 4.6 | 100 | 38 | — |
| C2 | CrN | — | — | — | 3.2 | 70 | 31 | 1,488 |
| C3 | CrN | Zinc Phosphate | — | — | — | — | — | 11,088 |
| C4 | CrN | Manganese Phosphate | — | — | — | — | — | 18,483 |
| C5 | CrN | — | — | — | 6.7 | 146 | 47 | — |

Note:
[1]Average particle size.
[2]Absolute value of the thermal sag ratio.
[3]Relative value of the thermal sag ratio.
[4]The microwelding resistance life expressed by the number of pressure-applying cycles until microwelding occurred.

5. The method for producing a compression ring according to claim 4, wherein said spheroidizing annealing step is conducted at a temperature of 600-720° C.

6. The method for producing a compression ring according to claim 4, wherein said oil-tempering treatment step is conducted at a quenching temperature of 820-980° C. and a tempering temperature of 400-500° C.

* * * * *